US010638879B2

(12) United States Patent
Bruin-Slot

(10) Patent No.: US 10,638,879 B2
(45) Date of Patent: May 5, 2020

(54) GRILLING APPLIANCE HAVING AIR JACKET FOR SMOKE REMOVAL AND VENTILATION

(71) Applicant: Whirlpool Corporation, Benton Harbor, MI (US)

(72) Inventor: Zachary J. Bruin-Slot, Baroda, MI (US)

(73) Assignee: Whirlpool Corporation, Benton Harbor, MI (US)

( * ) Notice: Subject to any disclaimer, the term of this patent is extended or adjusted under 35 U.S.C. 154(b) by 674 days.

(21) Appl. No.: 14/736,318

(22) Filed: Jun. 11, 2015

(65) Prior Publication Data

US 2016/0360924 A1 Dec. 15, 2016

(51) Int. Cl.
*A47J 37/07* (2006.01)
*A47J 37/06* (2006.01)

(52) U.S. Cl.
CPC ....... *A47J 37/0713* (2013.01); *A47J 37/0694* (2013.01)

(58) Field of Classification Search
CPC ............ A47J 37/04–049; A47J 37/0647; A47J 37/0652
USPC .......... 126/25 R, 29, 30, 28, 26, 25 A, 25 B, 126/25 C; 99/476, 474, 467
See application file for complete search history.

(56) References Cited

U.S. PATENT DOCUMENTS

| 3,797,375 | A | * | 3/1974 | Cerola | ................ | A47J 37/0676 |
| | | | | | | 219/449.1 |
| 4,962,694 | A | * | 10/1990 | Graver | .................... | A47J 36/38 |
| | | | | | | 126/21 A |
| 2006/0157046 | A1 | * | 7/2006 | Na | ...................... | A47J 37/0709 |
| | | | | | | 126/25 R |
| 2008/0168977 | A1 | * | 7/2008 | Daud | ................... | A47J 37/0754 |
| | | | | | | 126/25 B |
| 2014/0230666 | A1 | * | 8/2014 | Atlaw | ................. | A47J 37/0786 |
| | | | | | | 99/449 |

FOREIGN PATENT DOCUMENTS

| CN | 203122170 U | 8/2013 |
| JP | 2000051090 A | 2/2000 |

* cited by examiner

*Primary Examiner* — Ibrahime A Abraham
*Assistant Examiner* — Biniam B Asmelash
(74) *Attorney, Agent, or Firm* — Price Heneveld LLP

(57) ABSTRACT

A ventilated grilling device includes a plurality of grates each having interior channels defined therein, a housing positioned at a first end of each of the plurality of grates, the housing having a ventilating interior in communication with each of the interior channels, a heat-conductive ceramic plate positioned below the plurality of grates, wherein the space defined between the top surface of the ceramic plate and the grates defines a suction jacket that is in fluid communication with the ventilating interior of the housing and a heat source positioned below the ceramic plate, wherein heat from the heat source is thermally transferred through the ceramic plate and up to a cooking region positioned proximate an upper portion of the plurality of grates.

4 Claims, 11 Drawing Sheets

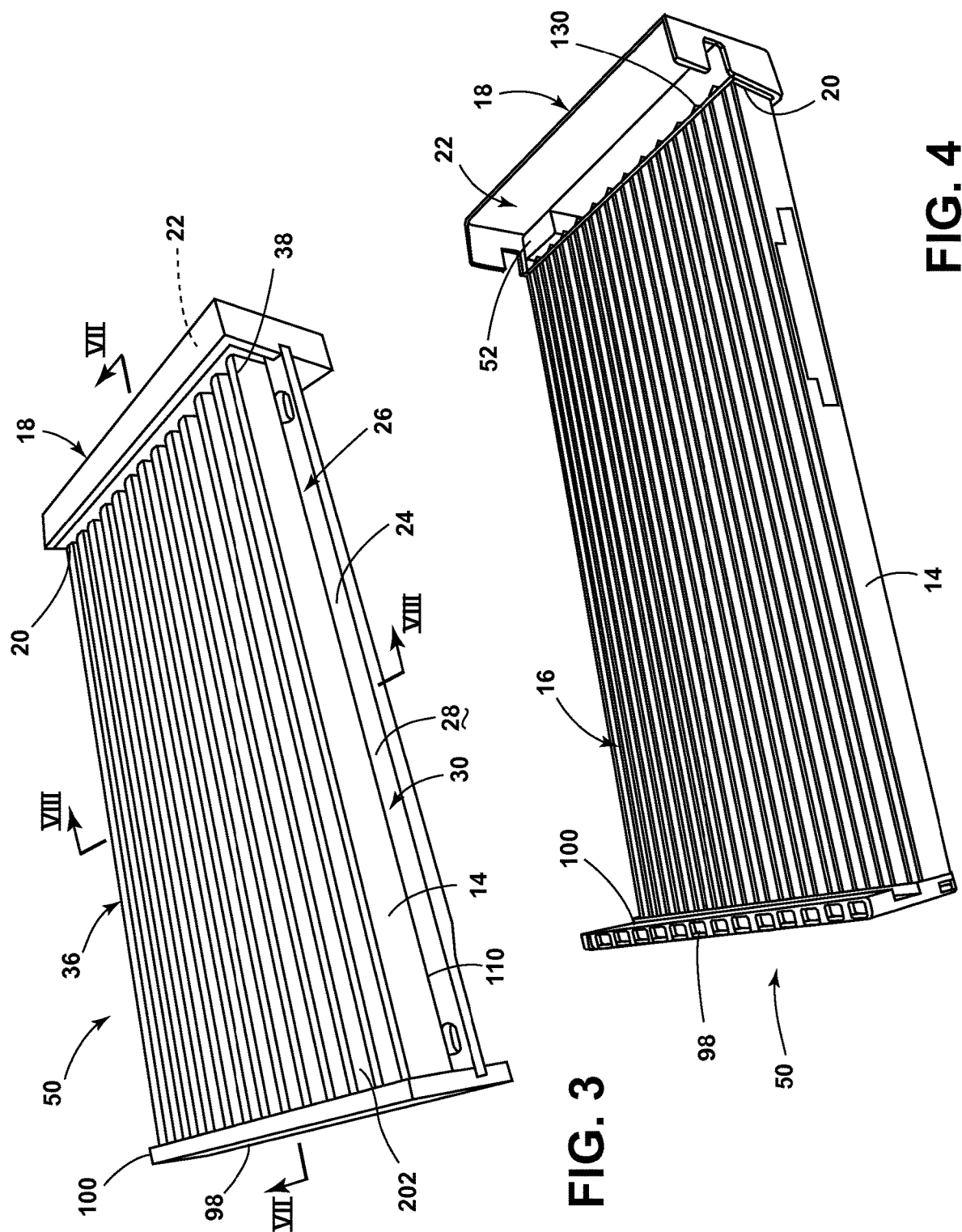

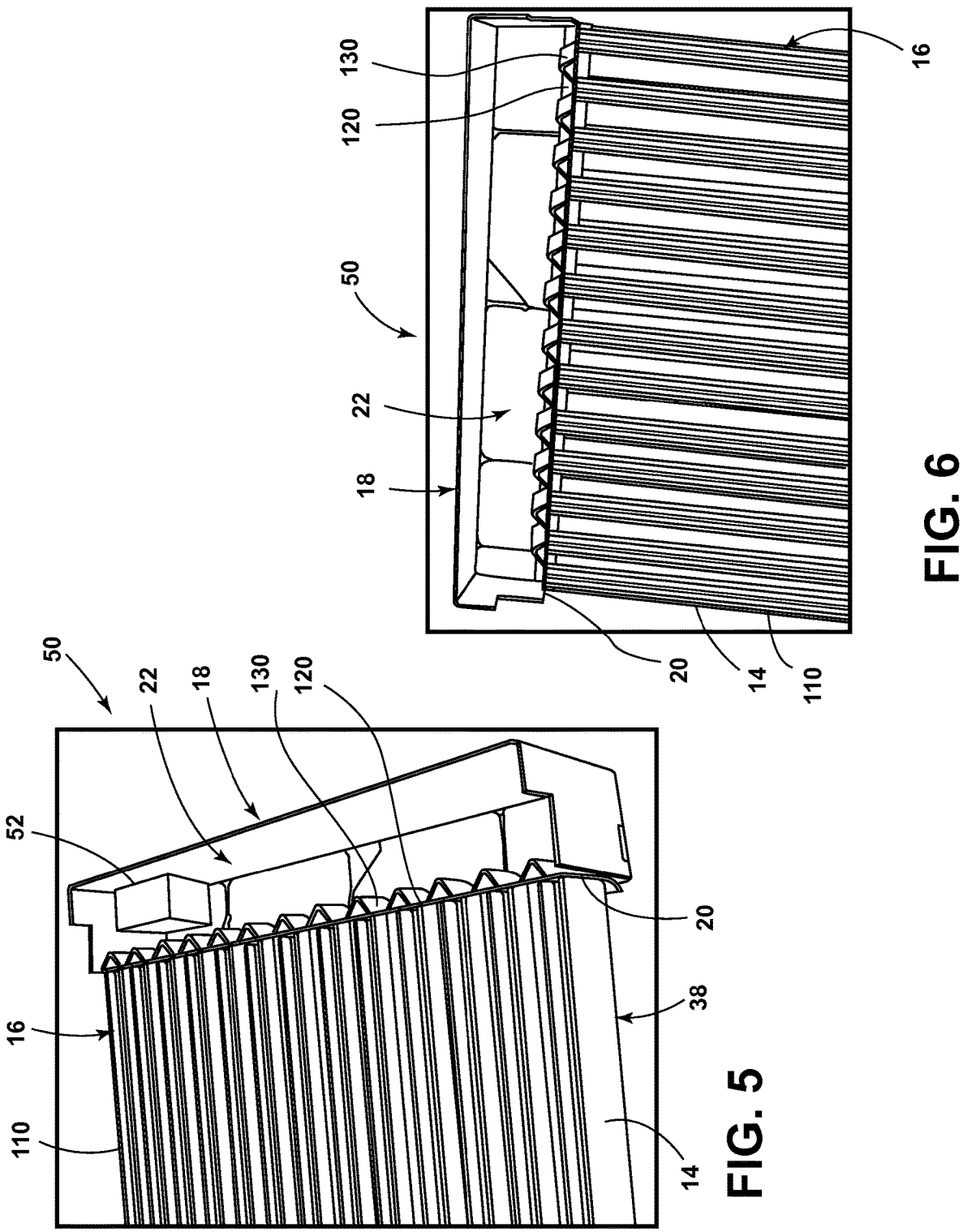

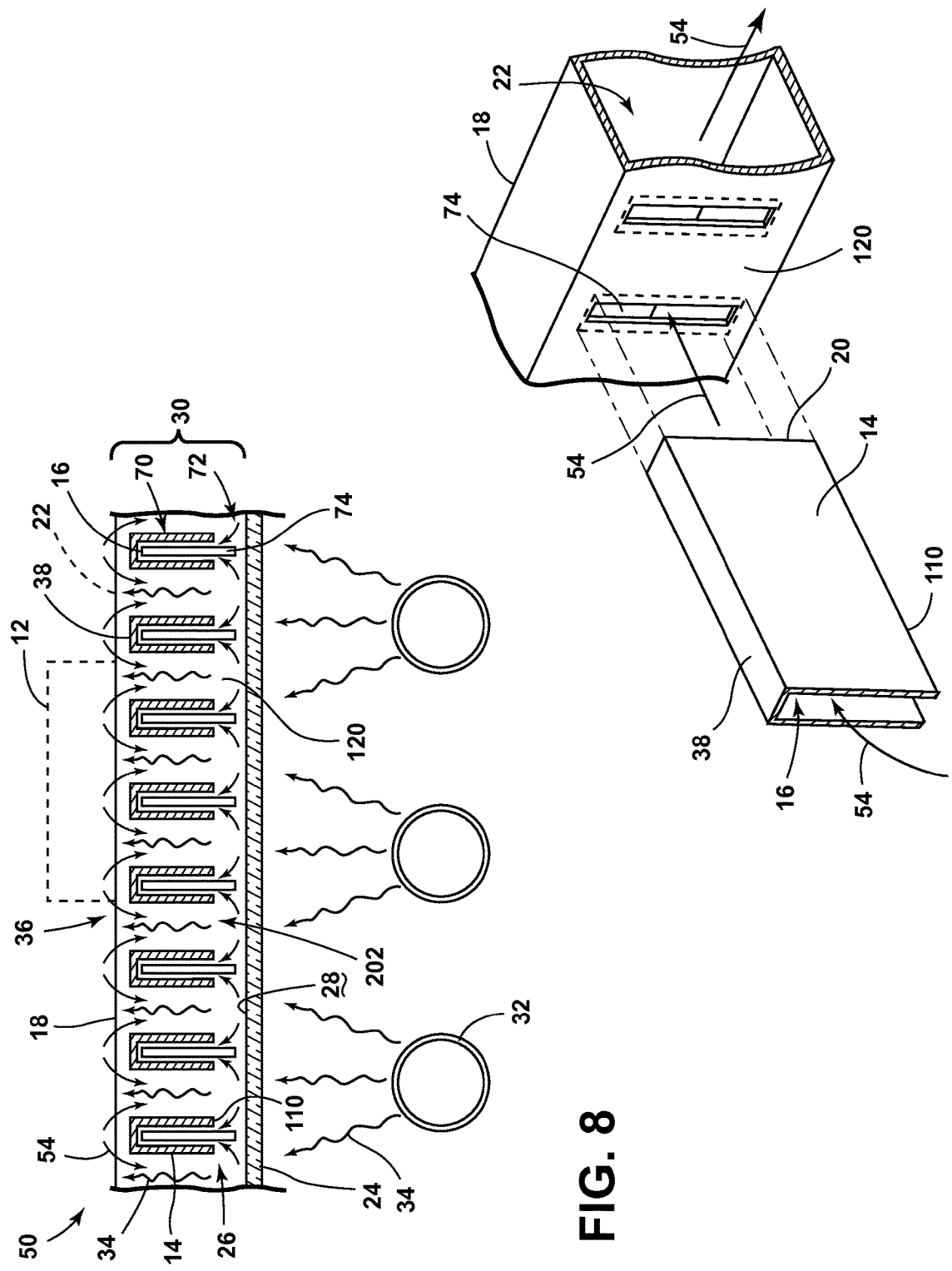

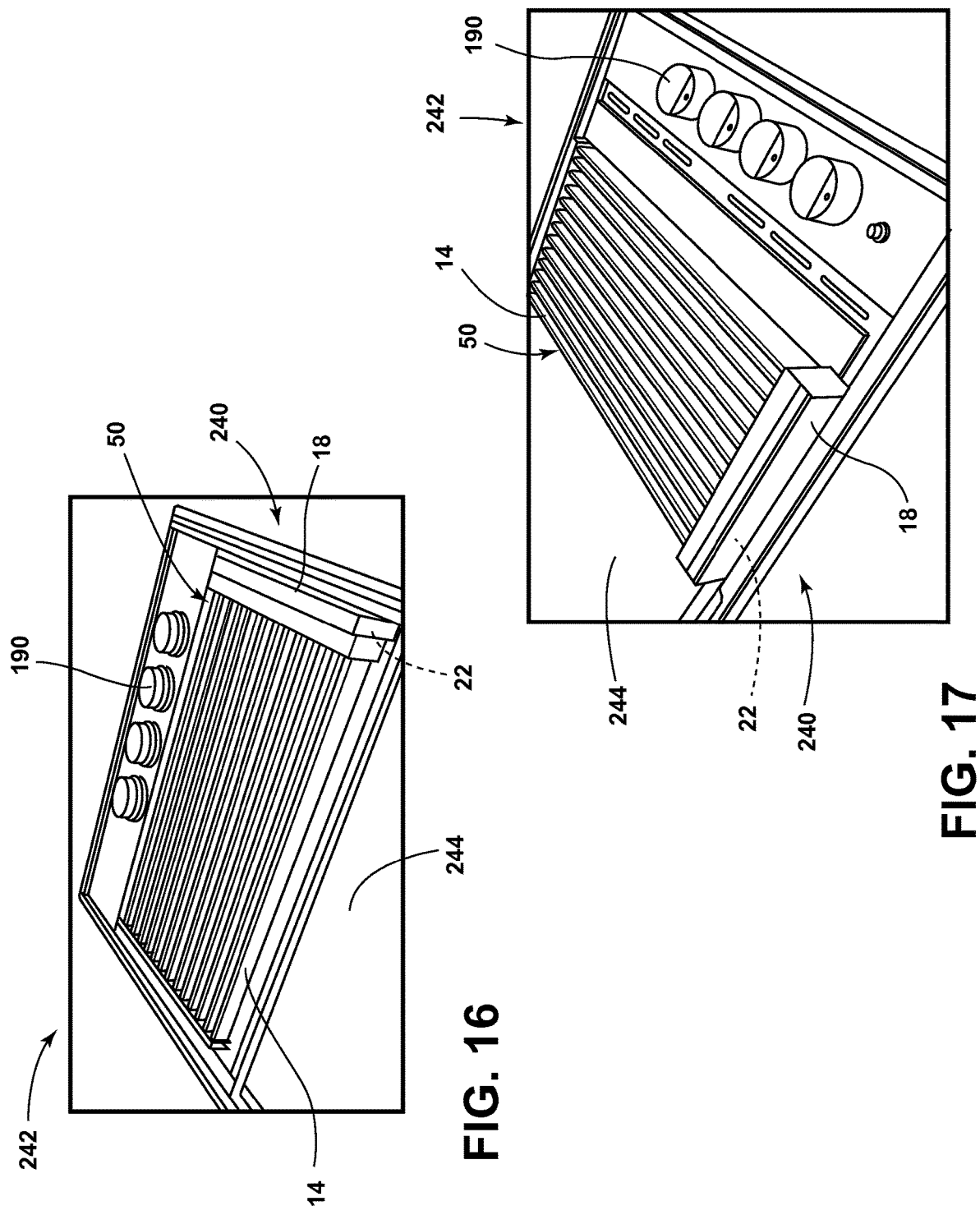

GRILLING APPLIANCE HAVING AIR JACKET FOR SMOKE REMOVAL AND VENTILATION

BACKGROUND

The present device is in the field of grilling appliances for the cooking of food items, specifically, a grilling appliance having an air jacket for the removal of smoke and for providing additional ventilation during grilling.

SUMMARY

In at least one aspect, a ventilated grilling device includes a plurality of grates each having interior channels defined therein, a housing positioned at a first end of each of the plurality of grates, the housing having a ventilating interior in communication with each of the interior channels, a heat-conductive ceramic plate positioned below the plurality of grates, wherein the space defined between the top surface of the ceramic plate and the grates defines a suction jacket that is in fluid communication with the ventilating interior of the housing and a heat source positioned below the ceramic plate, wherein heat from the heat source is thermally transferred through the ceramic plate and up to a cooking region positioned proximate an upper portion of the plurality of grates.

In at least another aspect, a ventilated grilling device includes a housing having a ventilating interior portion in communication with a suction jacket, an air handling assembly in communication with the ventilating interior of the housing, a plurality of grates positioned at an upper region of the suction jacket, a heat-conductive plate positioned within a lower region of the suction jacket, wherein the ventilating interior of the housing draws heated air from proximate the plurality of grates and a top surface of the heat-conductive plate and ejects the heated air to an area exterior of a grill body and a heat source positioned below the heat-conductive plate, wherein heat from the heat source is thermally transferred through the heat-conductive plate and up to a cooking region positioned proximate an upper portion of the plurality of grates.

In at least another aspect, the ventilated grilling manifold includes a housing having a ventilating interior portion in communication with a suction jacket, an air handling assembly disposed proximate to and in communication with the ventilating interior of the housing, a plurality of grates extending from the housing and positioned at an upper region of the suction jacket and a heat-conductive plate positioned within a lower region of the suction jacket, wherein the ventilating interior of the housing draws heated air from proximate the plurality of grates and a top surface of the heat-conductive plate and ejects the heated air to an area exterior of the housing and the plurality of grates.

These and other features, advantages, and objects of the present device will be further understood and appreciated by those skilled in the art upon studying the following specification, claims, and appended drawings.

BRIEF DESCRIPTION OF THE DRAWINGS

In the drawings:

FIG. 3 is a top perspective view of an alternate embodiment of the ventilated grilling manifold;

FIG. 4 is a bottom perspective view of the ventilated grilling manifold of FIG. 3 with the heat-conductive plate removed;

FIG. 5 is an enlarged bottom perspective view of the ventilated grilling manifold of FIG. 4;

FIG. 6 is an enlarged bottom perspective view of the ventilated grilling manifold of FIG. 5 with the air handling assembly removed;

FIG. 8 is a schematic cross-sectional view of the ventilated grilling manifold of FIG. 3 taken along line VIII-VIII with a heat source placed below the ventilated grilling manifold and a food item placed upon the grates;

FIG. 9 is a partially exploded view of a portion of the ventilated grilling manifold of FIG. 3 showing the engagement of one of the grates with the housing;

FIG. 16 is a top perspective view of an indoor grilling appliance incorporating an embodiment of the ventilated grilling manifold;

FIG. 17 is an alternate top perspective view of the indoor grilling appliance of FIG. 16.

DETAILED DESCRIPTION OF EMBODIMENTS

Figure 1:
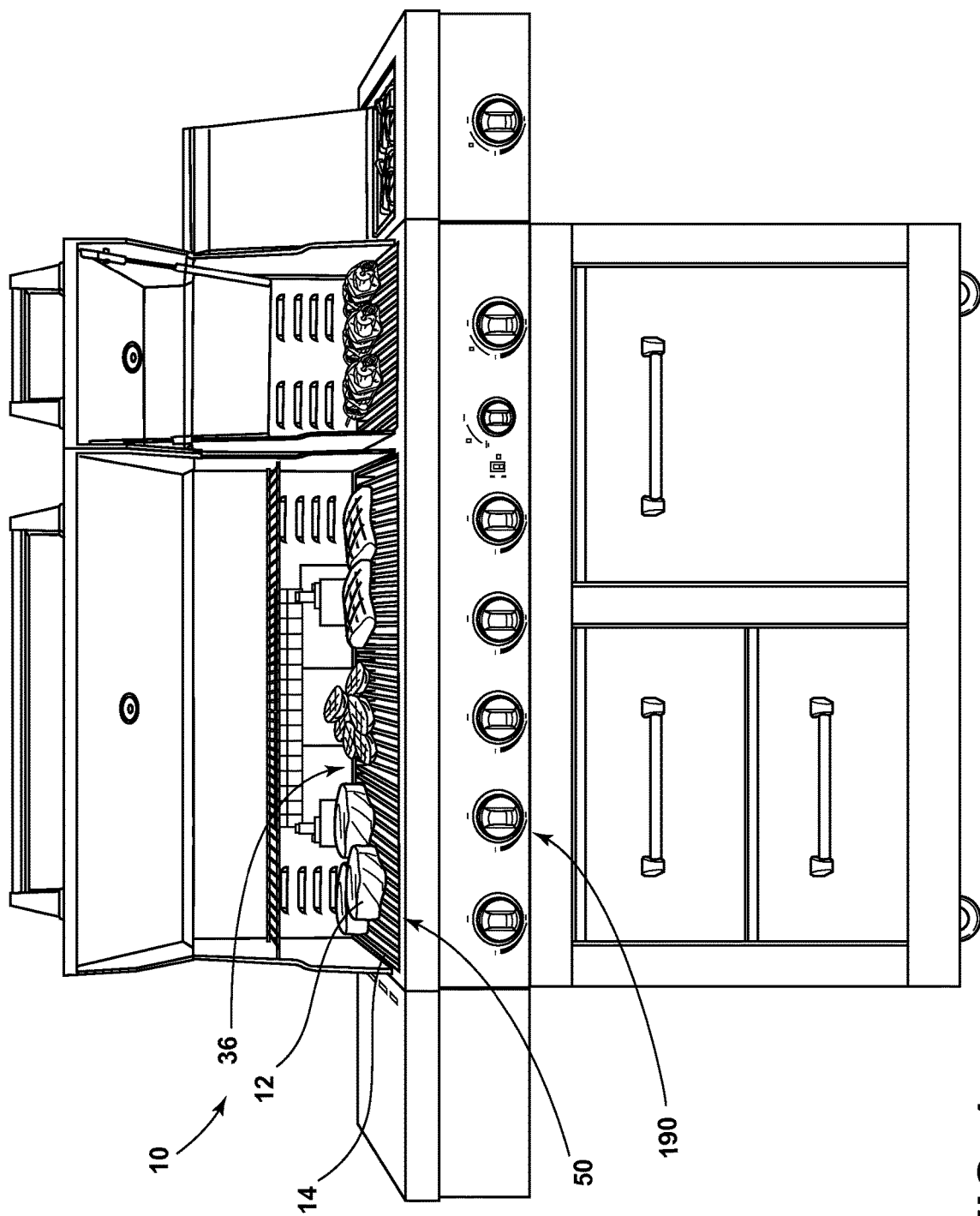
FIG. 1 is a front perspective view of a grilling appliance incorporating an embodiment of the ventilated grilling manifold.
Figure 2:
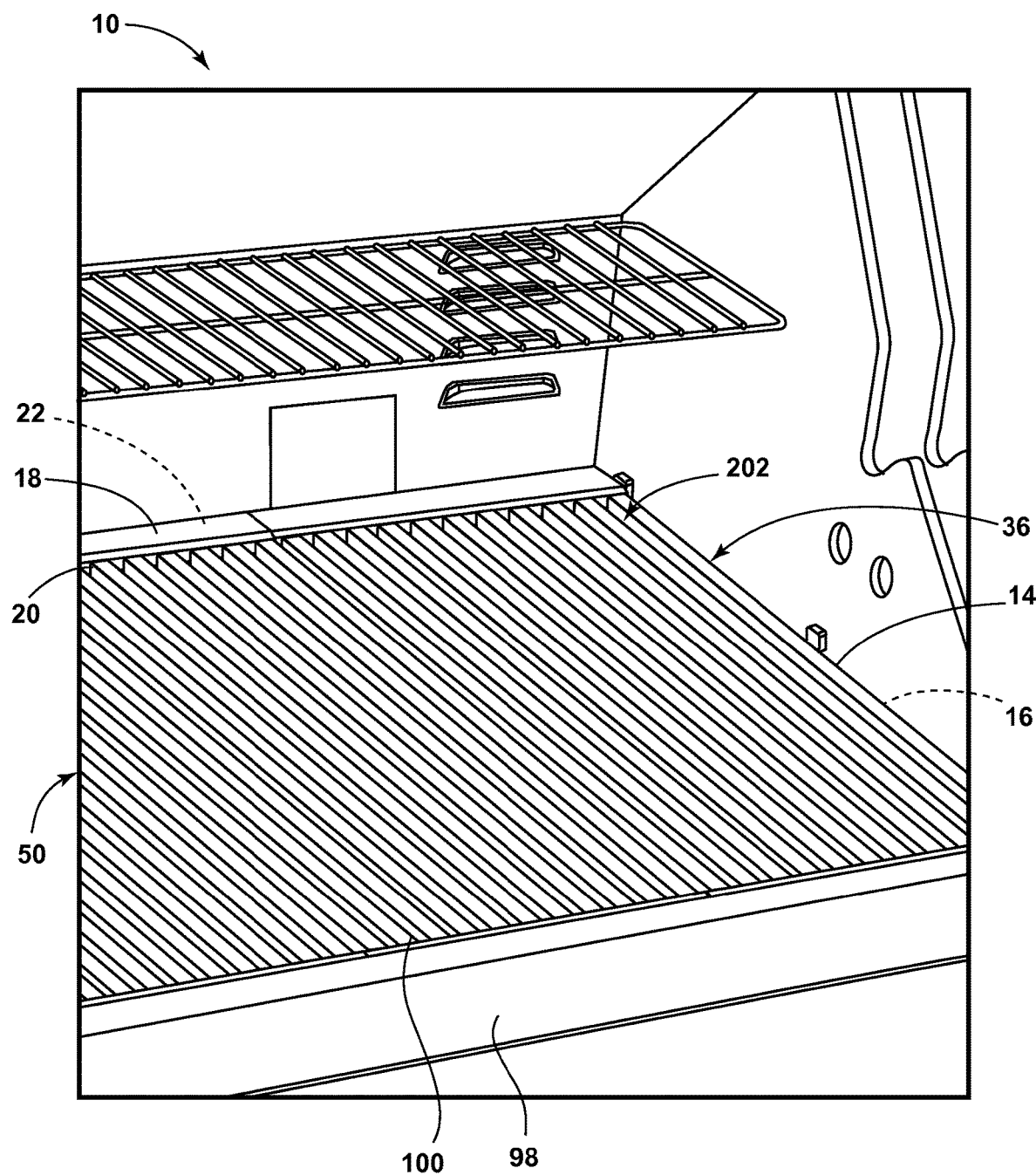
FIG. 2 is a top perspective view of a portion of the grilling appliance of FIG. 1.

For purposes of description herein the terms "upper," "lower," "right," "left," "rear," "front," "vertical," "horizontal," and derivatives thereof shall relate to the device as oriented in FIG. 1. However, it is to be understood that the device may assume various alternative orientations and step sequences, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

As illustrated in FIGS. 1-9, reference numeral 10 generally refers to a ventilated grilling device for the cooking of various food items placed thereon. The ventilated grilling device 10 includes a plurality of grates 14, each having ventilating interior channels 16 defined therein. A housing 18 is positioned at a first end 20 of each of the grates 14. The housing 18 includes a ventilated interior 22 that is in communication with each of the interior channels 16 of the grates 14. A heat-conductive plate 24, such as a heat-conductive ceramic plate, is positioned below the grates 14, wherein a space 26 is defined between the top surface 28 of the heat-conductive plate 24 and the grates 14. This space 26 at least partially defines a suction jacket 30 that is in fluid communication with the ventilated interior 22 of the housing 18. A heat source 32 is positioned below the heat-conductive plate 24 and heat 34 from the heat source 32 is thermally transferred through the heat-conductive plate 24 and up to a cooking region 36 positioned proximate an upper portion 38 of the grates 14. According to the various embodiments, it is contemplated that the interior channels 16 of each of the grates 14 opens in a downward direction and toward the top surface 28 of the heat-conductive plate 24.

Referring again to the embodiment illustrated in FIGS. 3-9, the ventilated grilling device 10 can include a ventilated grilling manifold 50 disposed within the ventilated grilling device 10. The ventilated grilling manifold 50 can include the housing 18 having the ventilated interior 22 that is in communication with the suction jacket 30. An air handling assembly 52 can be disposed proximate to and in communication with the ventilated interior 22 of the housing 18, wherein the air handling assembly 52 is configured to draw air 54 from the suction jacket 30 of the ventilated grilling manifold 50 and eject the air 54 drawn from the suction jacket 30 to an area exterior of the ventilated grilling device 10.

According to various embodiments, as illustrated in FIGS. 3-9, the ventilated grilling manifold 50 can include the grates 14 that extend laterally from the housing 18 where the grates 14 are positioned at an upper region 70 of the suction jacket 30. It is contemplated that the heat-conductive plate 24 can be positioned within the lower region 72 of the suction jacket 30, wherein the ventilated interior 22 of the housing 18 draws air 54 that may have been heated from an area proximate the plurality of grates 14 and the top surface 28 of the heat-conductive plate 24 and ejects this air 54 to an area exterior of the housing 18 and the plurality of grates 14. It is also contemplated that the housing 18 can include a plurality of ventilation apertures 74, where each of the plurality of ventilation apertures 74 is substantially in alignment with the corresponding ventilated interior channel 16 of each of the grates 14. According to such an embodiment, air 54 drawn from the suction jacket 30 and into the ventilated interior 22 of the housing 18 travels through at least a portion of the ventilation apertures 74 defined within the housing 18. It is contemplated that the ventilated grilling manifold 50 can be disposed within any one of various grilling devices, such that the ventilated grilling manifold 50 can be installed with new ventilated grilling devices 10 or can be used to retrofit various grilling devices to become a ventilated grilling device 10 through the implementation of the ventilated grilling manifold 50.

Figure 7:
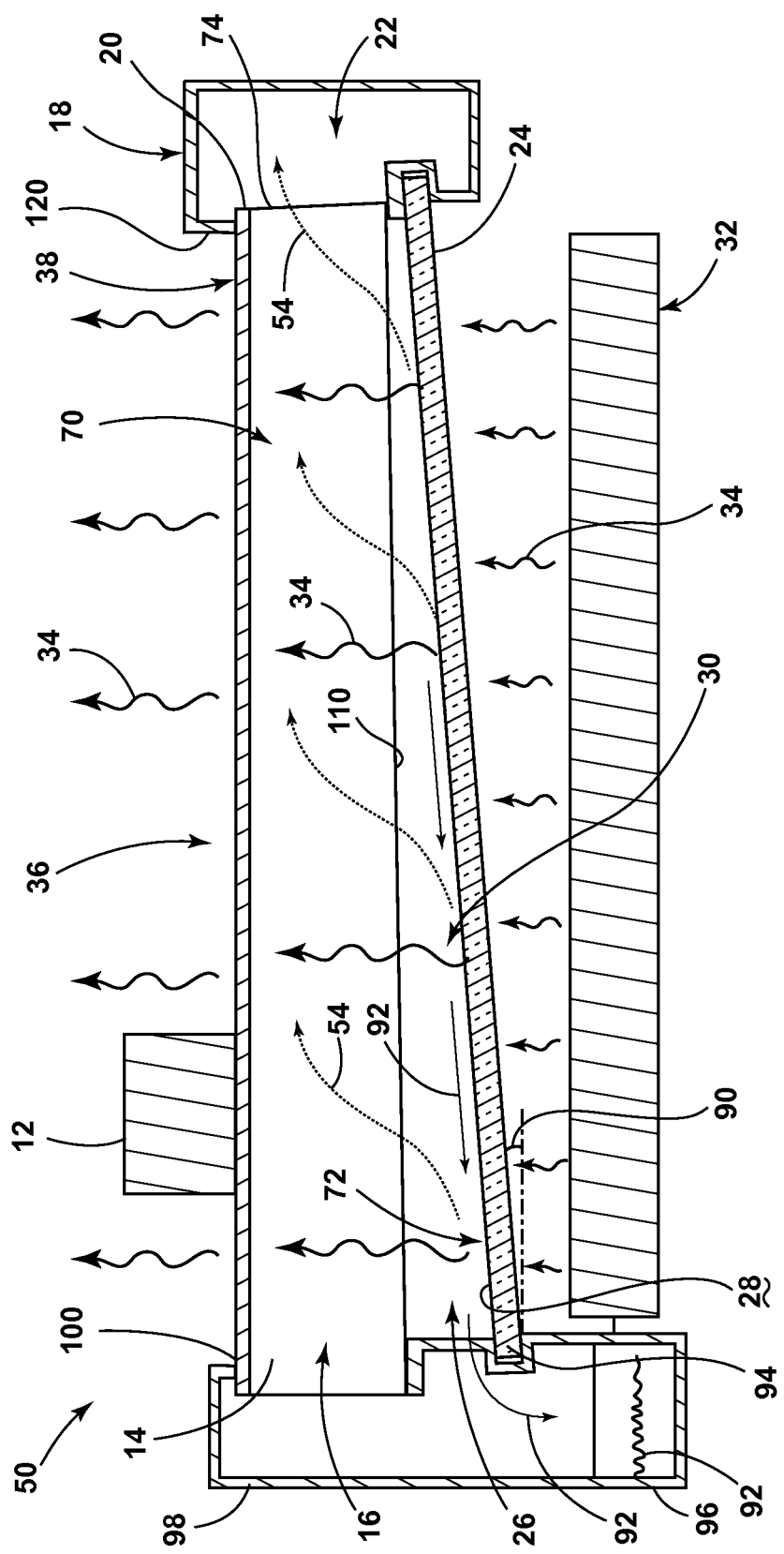
FIG. 7 is a schematic cross-sectional view of the ventilated grilling manifold of FIG. 3 taken along line VII-VII with a heat source positioned below the ventilated grilling manifold and a food item placed upon the grates.

Referring again to the embodiment illustrated in FIG. 7, it is contemplated that the heat-conductive plate 24 can be disposed at a predetermined angle 90 relative to the plurality of grates 14. In various embodiments, the predetermined angle 90 can be such that the heat-conductive plate 24 slopes downward and away from the housing 18 such that the suction jacket 30 proximate the housing 18 having the ventilated interior 22 is defined by a smaller space 26 than the space 26 defined by the suction jacket 30 at an opposing side of the heat-conductive plate 24. In this manner, grease, fluid, food particles, and other debris 92 that may fall from the grates 14 onto the heat-conductive plate 24 can be moved toward a lower end 94 of the heat-conductive plate 24. The lower end 94 of the heat-conductive plate 24 is typically positioned opposite the housing 18 having the ventilated interior 22. Accordingly, as this debris 92 moves toward a lower end 94 of the heat-conductive plate 24, the debris 92 may fall off from the lower end 94 of the heat-conductive plate 24 and into a debris container 96, such as a grease trap, that can be disposed within a secondary housing 98 of the ventilated grilling manifold 50. It is contemplated that a second end 100 of the grates 14 can engage the secondary housing 98.

According to the various embodiments, the debris container 96 can be selectively removed for disposal of various debris 92 that can become disposed within the debris container 96. Such a debris container 96 can be removed from the secondary housing 98 by pulling the debris container 96 in an upward direction and out of the secondary housing 98. In such an embodiment, removal of the debris container 96 can be performed without removing portions of the ventilated grilling manifold 50 from the ventilated grilling device 10. It is also contemplated that the debris container 96 can be removed from the secondary housing 98 by sliding the debris container 96 laterally or downward from the secondary housing 98 to remove the debris container 96 for emptying the debris container 96 therein. According to alternate embodiments, it is contemplated that the predetermined angle 90 of the heat-conductive plate 24 may create a slope toward the housing 18 having the ventilated interior 22. In such an embodiment, the debris container 96 can be positioned within or adjacent to the housing 18.

Referring again to the embodiment illustrated in FIG. 7, it is contemplated that the predetermined angle 90 of the heat-conductive plate 24 can also assist with the ventilation of air 54 from the suction jacket 30. In this manner, the varying distances of the space 26 between the bottom edge 110 of each of the grates 14 and the top surface 28 of the heat-conductive plate 24 can account for differences in air pressure throughout the suction jacket 30. The air handling assembly 52 creates an at least partial vacuum around portions of the ventilated interior 22 of the housing 18. Accordingly, the air pressure of the suction jacket 30 closer to the housing 18 having the ventilated interior 22 may be less than air pressure at portions of the suction jacket 30 that are farther from the housing 18 having the ventilated interior 22. Therefore, differences in the distance between the bottom edge 110 of the grates 14 and the top surface 28 of the heat-conductive plate 24 can account for this air pressure difference to provide substantially equalized pressure throughout the entire suction jacket 30 to evenly remove air 54 throughout the entire suction jacket 30. It is also contemplated that the housing 18 and the secondary housing 98 can each include an air handling assembly 52. In such an embodiment, both the housing 18 and the secondary housing 98 can include ventilated interiors 22 and ventilation apertures 74. Accordingly, air 54 can be drawn from the suction jacket 30 in either direction, toward the housing 18 or the secondary housing 98.

According to various alternate embodiments, it is contemplated that the predetermined angle 90 of the heat-conductive plate 24 can be such that the heat-conductive plate 24 slopes toward the housing 18. It is contemplated that such a slope may be necessary to equalize the pressure within the suction jacket 30 to provide for even air flow throughout the entire suction jacket 30 and into the ventilated interior 22 of the housing 18. The exact configuration of the predetermined angle 90 of the heat-conductive plate 24 can be determined by various factors that can include, but are not limited to, the size of the grates 14, the dimensions of the interior channels 16 of each of the grates 14, the overall design of the ventilated grilling manifold 50 and the ventilated grilling device 10, the capacity of the air handling assembly 52, the position of the air handling assembly (or assemblies) 52 relative to the suction jacket 30, the configuration of the heat-conductive plate 24, and other factors.

According to the various embodiments, it is also contemplated that instead of, or in addition to, sloping the heat-conductive plate 24 at a predetermined angle 90, the bottom edges 110 of each of the grates 14 can be positioned at a separate predetermined angle 90, such that the distance between the bottom edge 110 of each of the grates 14 and the top surface 28 of the edge of the heat-conductive plate 24 can vary due to the separate predetermined angle 90 defined by the bottom edge 110 of each of the grates 14. It is also contemplated that the suction jacket 30 can be made with a heat-conductive plate 24 that is positioned at the predetermined angle 90 and also having a consistent space 26 between the bottom edge 110 of the grates 14 and the top surface 28 of the heat-conductive plate 24, such that the bottom edges 110 of each of the grates 14 are also positioned at the predetermined angle 90.

Referring again to the embodiment illustrated in FIGS. 7 and 8, it is contemplated that the space 26 between the bottom edge 110 of each of the grates 14 and the top surface 28 of the heat-conductive plate 24 can be within the range of from about 1/16 inch to about 2 inches. It is also contemplated that spaces 26 less than 1/16 inch or greater than 2 inches can also be used in various embodiments of the ventilated grilling manifold 50. In addition to this space 26 between the bottom edge 110 of the grates 14 and the top surface 28 of the heat-conductive plate 24, it is contemplated that the suction jacket 30 can also include the interior channels 16 defined within each of the grates 14. In this manner, the space 26 between the top surface 28 of the heat-conductive plate 24 and the bottom edges 110 of each of the grates 14 as well as the internal channels of the grates 14 can define the suction jacket 30 of the ventilated grilling manifold 50. In addition to drawing air 54 from the suction jacket 30, it is also contemplated that the air handling assembly 52 of the ventilated grilling manifold 50 can draw at least some air 54 from portions of the cooking region 36 disposed proximate the upper portion 38 of each of the grates 14. In this manner, the air handling assembly 52 can also draw smoke that may be emanating from the upper portion 38 of the grates 14 and around the various food items 12 placed upon the upper portion 38 of the grates 14. As such, the air handling assembly 52 can also remove at least a portion of the smoke emanating from the cooking region 36 of the ventilated grilling manifold 50. Referring again to the embodiment illustrated in FIGS. 3-9, the air handling assembly 52 of the ventilated grilling manifold 50 can be positioned within the housing 18 and proximate the ventilated interior 22 of the housing 18. According to the various embodiments, the air handling assembly 52 is positioned in communication with the ventilated interior 22 of the housing 18 and also the ventilation apertures 74 defined within a wall 120 of the housing 18. Accordingly, when the air handling assembly 52 is activated, air 54 is drawn from the various portions of the suction jacket 30 defined between the grates 14 and the top surface 28 of the heat-conductive plate 24 and also the interior channels 16 of each of the grates 14. This air 54 from the suction jacket 30, which may be heated air 54, is then drawn at least partially through the interior channels 16 of the grates 14 and through the ventilation apertures 74 defined within the housing 18. The air handling assembly 52 then moves the air 54 from the ventilation apertures 74 of the housing 18 and through the ventilated interior 22 of the housing 18 and into the atmosphere surrounding the ventilated grilling device 10. It is contemplated that various filters and other sequestration devices for removing smoke from the air 54 can be included within various portions of the ventilated grilling manifold 50 and the ventilated grilling device 10 to remove smoke and other vaporized or particulate matter from the air 54 evacuated from the ventilated grilling device 10.

Referring again to the embodiments illustrated in FIGS. 3-9, it is contemplated that the heat-conductive plate 24 can be made of various heat conducting materials that can include, but are not limited to, ceramic, glass, ceramic glass, metal, combinations thereof, and other similar heat-conductive materials. Because of the heat-conductive nature of the heat-conductive plate 24, the heat-conductive plate 24 can serve as an infrared emitter that is configured to deliver substantially even amounts of heat 34 from a heat source 32 through the heat-conductive plate 24 and up through the grates 14 to the cooking region 36 of the ventilated grilling manifold 50. Accordingly, the heat source 32 of the ventilated grilling device 10 provides heat 34 to the heat-conductive plate 24, which heat 34 is then delivered upward, in a substantially even manner, through the grates 14 and to the various food items 12 disposed upon the upper portion 38 of the grates 14. In addition, the use of the heat-conductive plate 24 as an infrared emitter to deliver substantially even heat 34 to the cooking region 36 can serve to limit flaring or excessive flames that may reach up to and above the cooking region 36. It is contemplated that the heat source 32 of the ventilated grilling device 10 can be any one of various heat sources 32 that can include, but are not limited to, a natural gas burner, a propane gas burner, an electrically resistive heating element, an electrical induction heating element, charcoal, wood fired, combinations thereof, or other similar heat sources.

Referring again to the embodiments illustrated in FIGS. 3-9, the grates 14 of the ventilated grilling manifold 50 can be made of various materials that can include, but are not limited to, steel, stainless steel, other metal alloys, ceramic, ceramic glass, a ceramic coated material, combinations thereof, and other similar heat-conductive materials.

Referring now to the embodiment illustrated in FIGS. 5 and 6, adjacent to each of the ventilation apertures 74 disposed within the housing 18, a plurality of air flow directing fins 130 can be positioned within the ventilating interior of the housing 18. The air flow directing fins 130 can project inward into the ventilated interior 22 of the housing 18 to substantially direct the flow of air 54 from the ventilation apertures 74 and into portions of the housing 18. It is also contemplated that the air directing fins 130 can be extensions of each of the grates 14 that can extend inward through the ventilation apertures 74 or through an opening proximate each of the ventilation apertures 74 to define the air flow directing fins 130 disposed within the ventilated interior 22 of the housing 18. In such an embodiment, the air directing fins 130, being extensions of the grates 14, can serve to at least partially secure the grates 14 to the housing 18. In this manner, the air directing fins 130 can align the interior channels 16 of the grates 14 with the ventilation apertures 74 of the housing 18. It is also contemplated that the air flow directing fins 130 can be separate members disposed within the ventilation interior of the housing 18.

As illustrated in the embodiment of FIGS. 5 and 6, it is contemplated that the air flow directing fins 130 can be configured in a substantially triangular pattern. It is also contemplated that alternate configurations of the air flow directing fins 130 are possible, where such configurations can include, but are not limited to, arcuate configurations, rectilinear configurations, irregular configurations, and other similar configurations. It is further contemplated that the air flow directing fins 130 disposed within the ventilating interior of the housing 18 can have a tapered shape such that the distance between two adjacent air flow directing fins 130 is narrower at one end of the ventilation aperture 74 and wider at an opposing end of a ventilation aperture 74.

Referring now to the embodiment illustrated in FIGS. 10-11, the ventilated grilling manifold 50 can include a heat-conductive base plate 150 positioned below the heat-conductive plate 24 and configured to be positioned above the heat source 32. A perimetrical frame 152 can be included to extend between the heat-conductive plate 24 and the heat-conductive base plate 150 to define an interstitial space 154. It is contemplated that the suction jacket 30 can extend into at least a portion of the interstitial space 154 defined between the heat-conductive plate 24 and the heat-conductive base plate 150 and the perimetrical frame 152. It is also contemplated that the heat 34 from the heat source 32 can be transferred through the heat-conductive base plate 150, which also acts as an infrared emitter to allow heat 34 to transfer from the heat source 32, through the heat-conductive base plate 150, through the interstitial space 154 and then through the heat-conductive plate 24 and up to the cooking region 36 of the grates 14.

Referring again to FIGS. 10-11, in order to allow for the movement of air 54 from the interstitial space 154 and into the remainder of the suction jacket 30, a plurality of vent slots 170 are defined within the heat-conductive plate 24. It is contemplated that the vent slots 170 can be substantially aligned with the interior channels 16 of the plurality of grates 14. It is also contemplated that the plurality of vent slots 170 can serve to place the interstitial space 154 in communication with the ventilated interior 22 of the housing 18 by allowing for the movement of air 54 from the interstitial space 154, through the vent slots 170, into the space 26 defined between the top surface 28 of the heat-conductive plate 24 and the bottom edge 110 of the each of the grates 14, and through the ventilation apertures 74 defined within the housing 18 and into the ventilated interior 22 of the housing 18.

Figure 10:
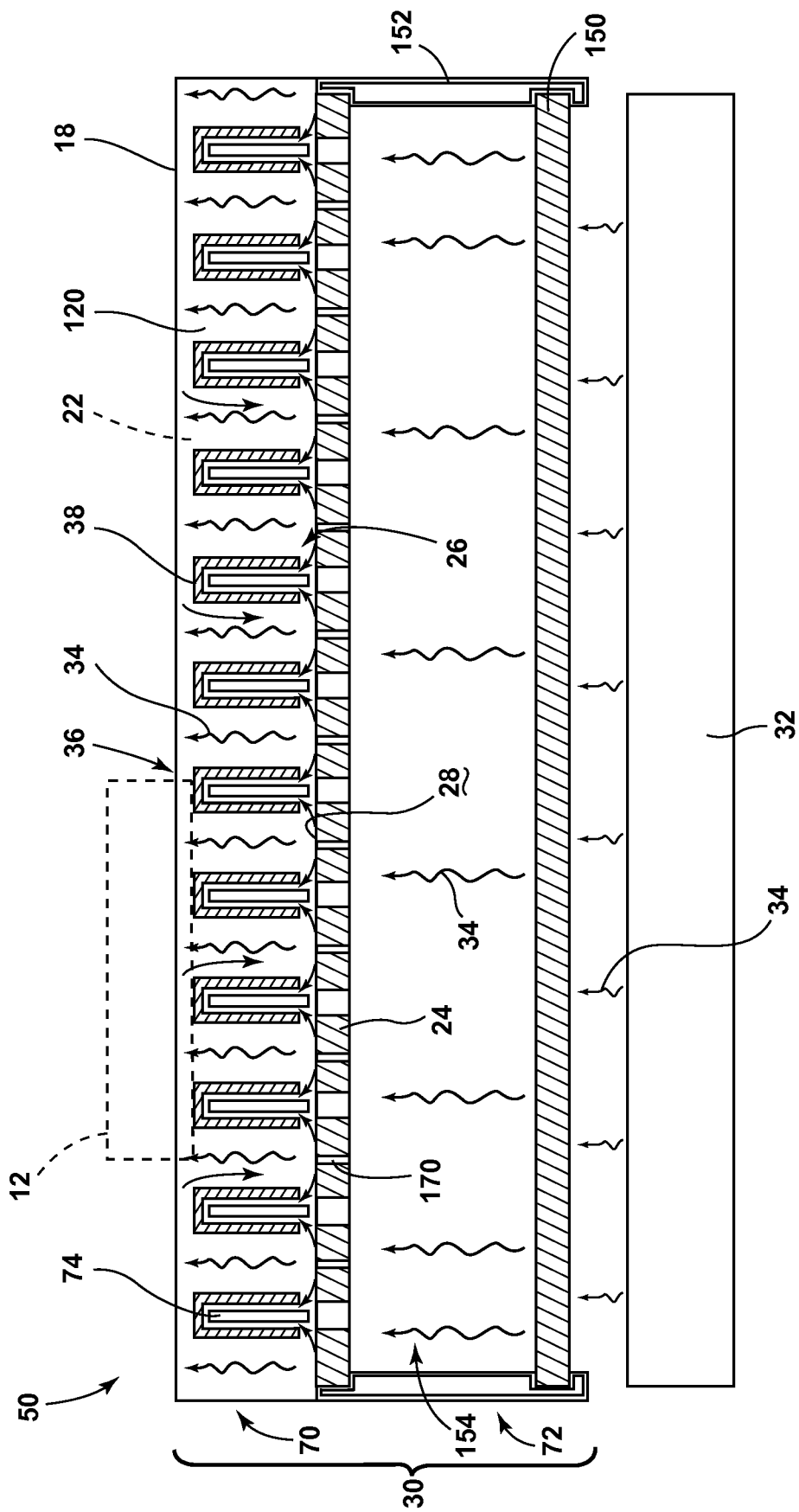
FIG. 10 is a schematic cross-sectional view of an alternate embodiment of the ventilated grilling manifold.
Figure 11:
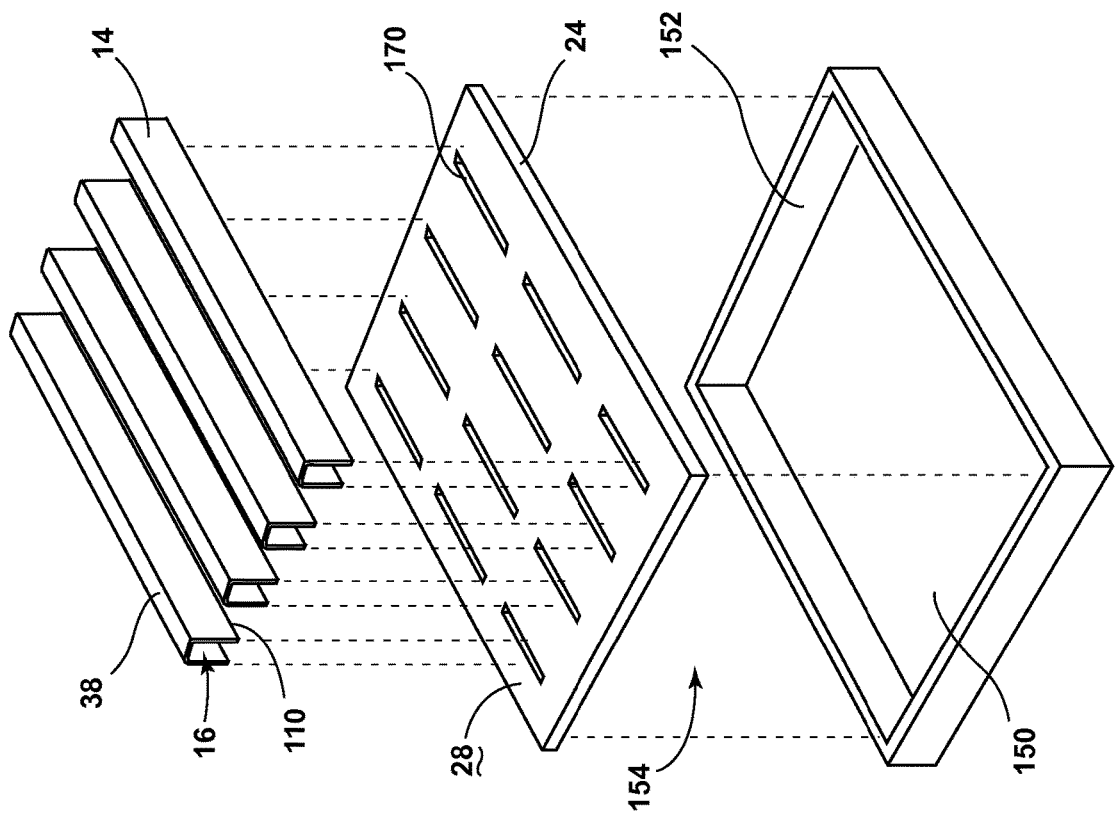
FIG. 11 is an exploded top perspective view of the ventilated grilling manifold of FIG. 10.
Figure 14:
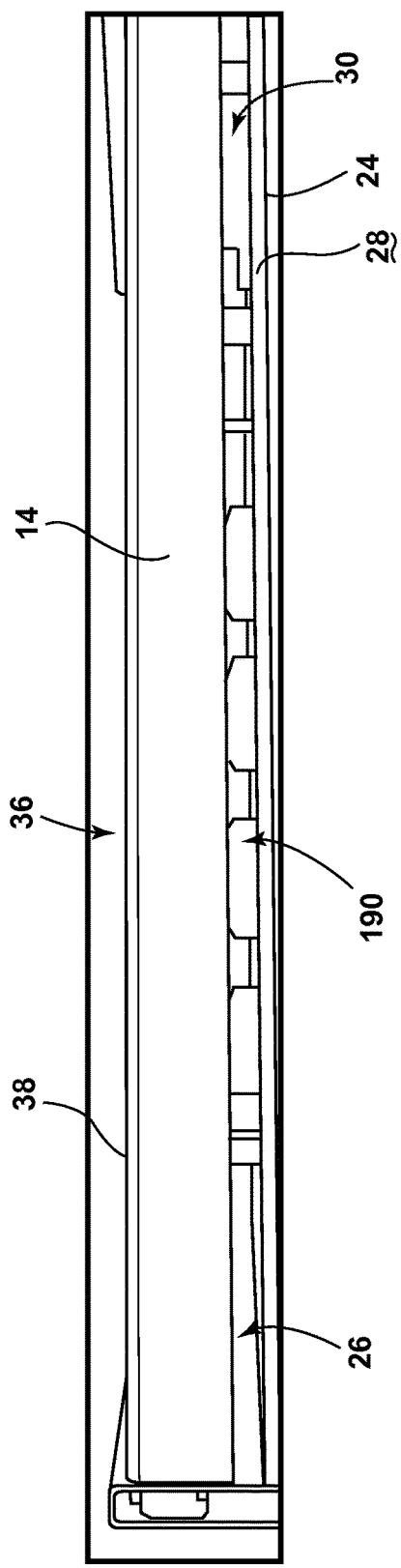
FIG. 14 is a side elevational view of an alternate embodiment of the ventilated grilling appliance.

Referring again to the embodiment illustrated in FIGS. 10-11, it is contemplated that the heat-conductive plate 24 positioned above the heat-conductive base plate 150 can be disposed at the predetermined angle 90, as described above in various embodiments. As with other embodiments, the predetermined angle 90 of the heat-conductive plate 24 is configured to perform various functions that can include, but are not limited to, allowing for the disposal of various debris 92 that may fall from the cooking region 36 to be transferred to a debris container 96, allowing for substantially even air flow through the suction jacket 30, as well as acting as an infrared emitter for transferring heat 34 from the heat source 32 through the heat-conductive plate 24 and to the cooking region 36 disposed at an upper portion 38 of the grates 14.

According to the various embodiments, the heat-conductive base plate 150 can be made of materials similar to that of a heat-conductive plate 24. As discussed above, the heat-conductive base plate 150 is made of a heat-conductive material that allows for the transfer of heat 34 from the heat source 32 through the heat-conductive base plate 150 and into the interstitial space 154 for further transfer into the cooking region 36 of the ventilated grilling manifold 50. It is contemplated that the interstitial space 154 defined between the heat-conductive plate 24 and the heat-conductive base plate 150 can vary in depth. Such depth can be within the range of from about 1 inch to about 4 inches, to greater than 4 inches. It is contemplated that in the various embodiments, the distance between the heat-conductive plate 24 and the heat-conductive base plate 150 can vary, outside of these ranges, particularly where the heat-conductive plate 24 is positioned at the predetermined angle 90.

According to various embodiments, it is contemplated that the interstitial space 154 can be used for various accessory-type grilling functions that can include, but are not limited to, steaming, smoking, and other similar accessory grilling functions. Where a steaming function is implemented, various fluids can be disposed within the interstitial space 154 where the heat source 32 provides heat 34 through the heat-conductive base plate 150 and into a fluid disposed within the interstitial space 154 where the fluid is heated to create steam that emanates through the vent slots 170 of the heat-conductive plate 24 and into the cooking region 36 disposed on top of the grates 14. Where smoking functions are implemented, various smoking materials, such as wood chips, flavored particles, and various other smoking fuel can be disposed within the interstitial space 154 where the smoke can emanate from the interstitial space 154, through the vent slots 170 in the heat-conductive plate 24 and up to the cooking region 36 defined on the top of the grates 14. Where such accessory grilling uses are implemented through use of the ventilated grilling manifold 50, it is contemplated that the air handling assembly 52 may need to be temporarily deactivated in order to allow steam, flavored smoke, and other similar grilling functions to be used during the preparation of various food items 12 by the ventilated grilling manifold 50. Accordingly, there are times during the use of a ventilated grilling manifold 50 when smoke, steam, and other grilling functions are desirable and ventilation of these grilling functions are not desired. As such, it is contemplated that the air handling assembly 52 can include a shutoff switch or a programmable control (shown in FIGS. 1 and 16) where various grilling functions can be performed according to the predetermined selection of the grilling control 190, where various grilling functions can be selected and implemented that may not require use of the air handling assembly 52.

Figure 12:
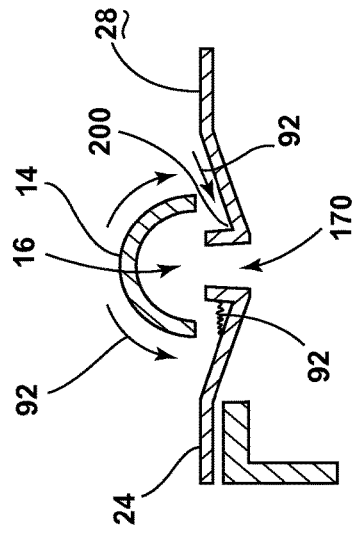
FIG. 12 is an enlarged cross-sectional view of an alternate configuration of grates positioned over a heat-conductive plate.
Figure 13:
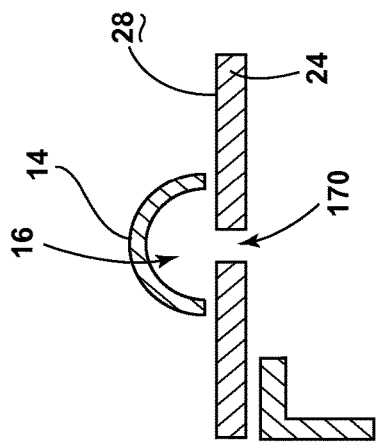
FIG. 13 is an alternate cross-sectional view of an alternate configuration of a heat-conductive plate.

Referring now to the embodiment illustrated in FIGS. 12 and 13, it is contemplated that the grates 14 of the ventilated grilling manifold 50 can include various cross-sectional shapes that extend from the ventilated apertures of the housing 18 to form the cooking region 36 of the ventilated grilling manifold 50. Such cross-sectional shapes can include, but are not limited to, rectilinear shapes, arcuate shapes, irregular patterns, and other similar cross-sectional configurations. The cross-sectional shape of the grates 14 can vary so long as the interior channels 16 of each of the grates 14 are configured such that air 54 is permitted to move through the interior channels 16 of each of the grates 14 and into the ventilating apertures of the housing 18 such that smoke can be moved from the suction jacket 30 and out of and away from the ventilated grilling device 10.

Referring again to the embodiment illustrated in FIG. 12, it is contemplated that the heat-conductive plate 24 can include at least one drain channel 200 defined within the top surface 28 of the heat-conductive plate 24. It is contemplated that various drain channels 200 can be used to allow for the movement of various debris 92, such as fluid, food particles, dripping and other grilling related debris 92, that may fall from the cooking region 36 onto the top surface 28 of the heat-conductive plate 24. It is contemplated that the drain channels 200 can be oriented to align with vertical gaps 202 defined between adjacent grates 14 such that material that falls within a vertical gap between adjacent grates 14 can be captured by the drain channel 200 and moved toward the debris container 96 positioned proximate a lower end 94 of the heat-conductive plate 24. In embodiments where the heat-conductive plate 24 includes vent slots 170 defined within the heat-conductive plate 24, the drain channels 200 can be positioned relative to the vent slots 170 such that the vent slots 170 can be positioned proximate the interior channels 16 of the grates 14 and the drain channels 200 are positioned under the vertical gaps 202 defined between the grates 14. In this manner, the vent slots 170 and drain channels 200 cooperate such that heated air 54 moved through the suction jacket 30 can move through the vent slots 170 and into the interior channels 16 of the grates 14 and debris 92 that falls from the cooking region 36 of the grates 14 falls between the vertical gaps 202 and into the drain channels 200. In such a configuration, it is contemplated that the heated air 54 moving through the suction jacket 30 and the debris 92 falling from the cooking region 36 do not substantially mix and the heated air 54 can be directed to move through the interior channels 16 of the grates 14 and into the ventilated interior 22 of the housing 18 and the debris 92 falling from the cooking region 36 can be directed into the drain channels 200 and toward the debris container 96 of the ventilated grilling manifold 50.

Figure 15:
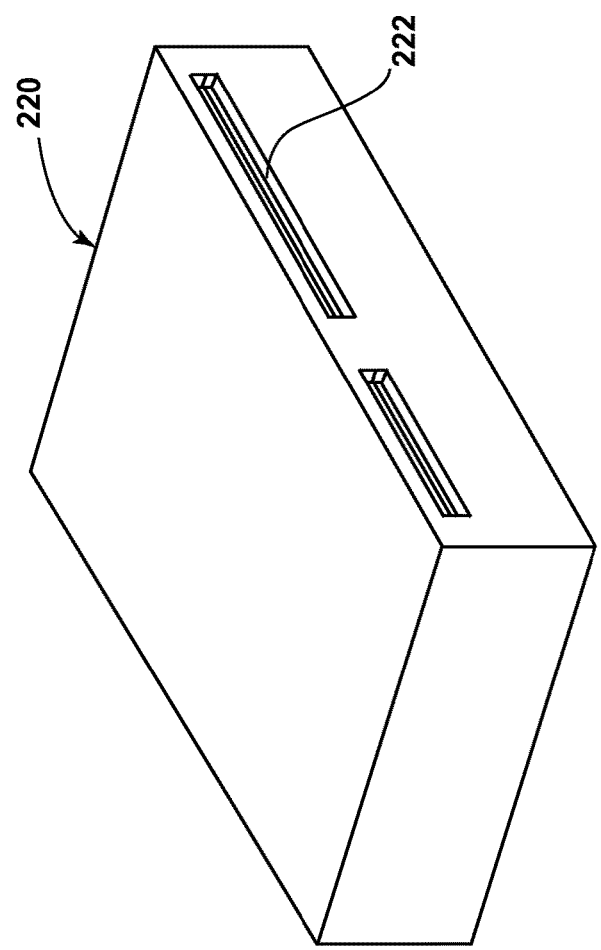
FIG. 15 is a top perspective view of an accessory grilling lid for an embodiment of the ventilated grilling manifold.

Referring now to the embodiment illustrated in FIG. 15, it is contemplated that the ventilated grilling manifold 50 can include an accessory grill lid 220 that can be placed over various food items 12 being cooked within the cooking region 36 of the ventilated grilling manifold 50. It is contemplated that the accessory grill lid 220 can include various accessory ventilation slots 222 defined within the accessory grill lid 220 to allow for the movement of air 54 through the suction jacket 30 of the ventilated grilling manifold 50. In such an embodiment, the accessory ventilation slots 222 of the accessory grill lid 220 allow the accessory grilling lid 220 to be placed over the ventilated grilling manifold 50 such that the accessory grill lid 220 does not substantially interrupt the flow of air 54 through the suction jacket 30. The accessory ventilation slots 222 can allow the air handling assembly 52 to draw air 54 through the accessory ventilation slots 222 and into the suction jackets 30 such that smoke can be moved through the ventilated interior 22 of the housing 18.

Figure 18:
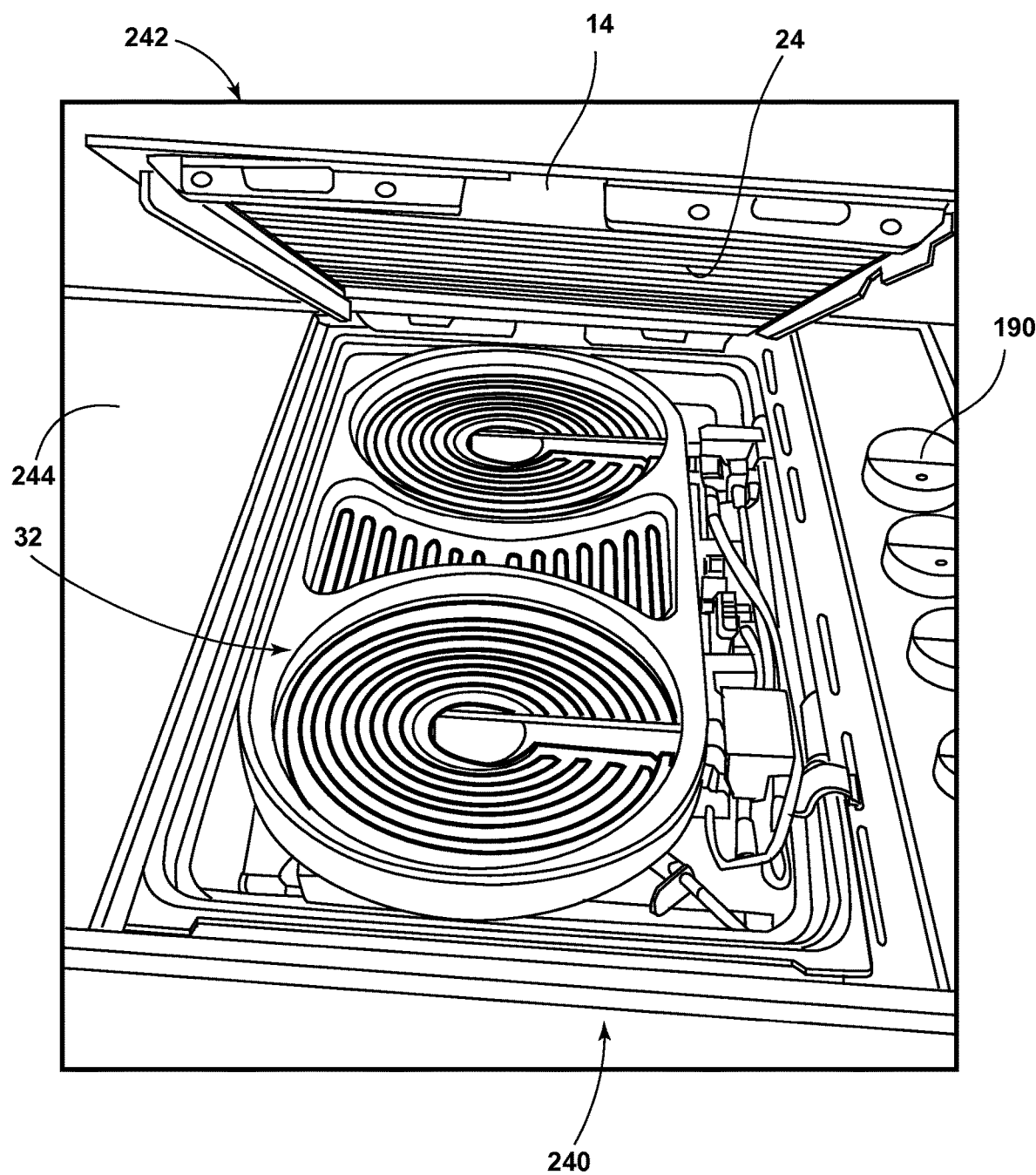
FIG. 18 is a partial perspective view of the indoor grilling appliance of FIG. 16 showing the heat-conductive plate lifted off from the heat source.

Referring now to the embodiment illustrated in FIGS. 16-18, it is contemplated that the ventilated grilling manifold 50 can be used in both exterior and interior applications. When used in an interior grill 240 for a residential kitchen 242, the ventilated grilling manifold 50 can be placed over a heat source 32 within a residential kitchen 242. Because the ventilated grilling manifold 50 includes the air handling assembly 52, smoke that may be created due to grilling can be exhausted from the ventilated grilling manifold 50 and into portions exterior to the residential kitchen 242, such as outside of the residence. Because smoke is ventilated through the suction jacket 30 and out of the ventilated interior 22 of the housing 18, the heat source 32 used within the interior application of the ventilated grilling manifold 50 can be an electrical element, either resistive or an induction element, or can be a combustive fuel such as natural gas, propane, charcoal, wood chips, or other similar combustible fuel. In an interior grill 240, it is contemplated that the ventilated grilling manifold 50 can be placed within a countertop 244 proximate the control 190 for the ventilated grilling manifold 50 disposed within the residential kitchen 242. In such an embodiment, it is contemplated that the heat source 32 can be installed within or under the countertop 244 and the ventilated grilling manifold 50 can be set thereon to be used for interior grilling functions.

It is also contemplated that the ventilated grilling manifold 50 can, in some embodiments, eliminate the need for an overhead hood mechanism as the ventilated interior 22 of the housing 18 can be configured to substantially remove smoke from the ventilated grilling manifold 50 through the communication of the air handling assembly 52 with the suction jacket 30. Because a hood may not be necessary, the desired aesthetics of a large open residential kitchen 242 can be achieved due to the absence of a large vent hood being disposed over the ventilated grilling manifold 50. Accordingly, smoke and various fumes that would normally be evacuated upward through a vent hood disposed above a conventional grilling appliance can be evacuated downward or laterally through the use of the suction jacket 30 and the ventilated interior 22 of the housing 18 to remove fumes from the ventilated grilling manifold 50 substantially before such smoke and fumes are allowed to escape the cooking region 36 of the ventilated grilling manifold 50.

According to various embodiments, it is contemplated that the size of the ventilated grilling manifold 50 can vary, such that multiple ventilated grilling manifolds 50 can be disposed within a single large ventilated grilling device 10. It is also contemplated that a single ventilated grilling manifold 50 can be made to have a substantially smaller size such that the ventilated grilling manifold 50 can be installed within devices that may serve a single individual for the grilling of single serving food items 12. It is contemplated that the ventilated grilling manifold 50 can be made of varying sizes in between to accommodate the particular application designed within the residential kitchen 242.

It will be understood by one having ordinary skill in the art that construction of the described device and other components is not limited to any specific material. Other exemplary embodiments of the device disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the device as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present device. The exemplary structures and processes disclosed herein are for illustrative purposes and are not to be construed as limiting.

It is also to be understood that variations and modifications can be made on the aforementioned structures and methods without departing from the concepts of the present device, and further it is to be understood that such concepts are intended to be covered by the following claims unless these claims by their language expressly state otherwise.

The above description is considered that of the illustrated embodiments only. Modifications of the device will occur to those skilled in the art and to those who make or use the device. Therefore, it is understood that the embodiments shown in the drawings and described above is merely for illustrative purposes and not intended to limit the scope of the device, which is defined by the following claims as interpreted according to the principles of patent law, including the Doctrine of Equivalents.

What is claimed is:

1. A ventilated grilling manifold for a grilling appliance, the ventilated grilling manifold comprising:
    a housing having a ventilating interior portion in communication with a suction jacket;
    a blower disposed proximate to and in communication with the ventilating interior portion of the housing, wherein a wall of the housing partially separates the suction jacket from the ventilating interior portion, and the ventilating interior portion is positioned between the suction jacket and the blower;
    a plurality of grates that extend through the wall and are partially positioned within the housing and the ventilating interior portion, wherein the plurality of grates extend outward from the housing and are positioned at an upper region of the suction jacket; and
    a heat-conductive plate having a top surface that defines a lower boundary of the suction jacket, the heat-conductive plate configured to be positioned over a heat source, wherein the suction jacket is further defined at least partially below the plurality of grates, and wherein the ventilating interior of the housing, via selective operation of the blower, draws heated air from above the heat-conductive plate and into the ventilating interior through the plurality of grates and ejects the heated air to an area exterior of the housing and the plurality of grates, wherein each of the plurality of grates includes an interior ventilation channel that defines a portion of the suction jacket, and wherein the plurality of grates directly engage the housing, wherein the suction jacket includes each of the interior ventilation channels, and wherein the plurality of grates and each of the interior ventilation channels extend through the wall into the housing and into the ventilating interior portion.

2. The ventilated grilling manifold of claim 1, wherein the housing includes a plurality of ventilation apertures, wherein each of the plurality of ventilation apertures is in alignment with a corresponding interior ventilation channel of the plurality of grates, wherein heated air drawn from the suction jacket into the ventilating interior of the housing travels through the plurality of ventilation apertures.

3. The ventilated grilling manifold of claim 2, wherein the heat-conductive plate is disposed at a predetermined angle relative to the plurality of grates, the top surface of the heat-conductive plate being in communication with a debris container positioned proximate the heat-conductive plate.

4. The ventilated grilling manifold of claim 3, further comprising:
    a heat-conductive base plate positioned below the heat-conductive plate;
    a perimetrical frame extending between the heat-conductive plate and the heat-conductive base plate to define an interstitial space, wherein the suction jacket is further defined by the interstitial space defined between the heat-conductive plate, the heat-conductive base plate and the perimetrical frame; and
    a plurality of vent slots defined within the heat-conductive plate and aligned with the plurality of grates, wherein the plurality of vent slots place the interstitial space in communication with the ventilating interior of the housing.

* * * * *